United States Patent [19]
Homer

[11] Patent Number: 6,040,979
[45] Date of Patent: Mar. 21, 2000

[54] COMPUTER HAVING MODULE BAY WITH VARIABLE INSERTION OPENING SIZE

[75] Inventor: Steven S. Homer, Cypress, Tex.

[73] Assignee: Compaq Computer Corporation, Houston, Tex.

[21] Appl. No.: 09/025,411

[22] Filed: Feb. 18, 1998

[51] Int. Cl.$^7$ ...................................................... G06F 1/16
[52] U.S. Cl. ............................................ 361/683; 361/685
[58] Field of Search .................................. 361/685, 683, 361/684, 617; 364/108.1; 429/100, 96, 97, 98; 307/150

[56] References Cited

U.S. PATENT DOCUMENTS

| | | | |
|---|---|---|---|
| 5,299,089 | 3/1994 | Lwee | 361/684 |
| 5,442,513 | 8/1995 | Lo | 361/685 |
| 5,559,672 | 9/1996 | Buras, Jr. et al. | 361/684 |

*Primary Examiner*—Gerald Tolin
*Assistant Examiner*—John D. Reed
*Attorney, Agent, or Firm*—Konneker & Smith, P.C.

[57] ABSTRACT

A notebook computer has a base housing with an exterior wall area through which an insertion opening extends into an internal bay area adapted to interchangeably receive a first modular device, such as a drive unit, having a cross-sectional area substantially equal to that of the insertion opening, or a second modular device, such as a battery, having a cross-sectional area substantially smaller than that of the insertion opening. A spring-loaded door member blocks a portion of the insertion opening, leaving an unblocked portion thereof having a cross-sectional area substantially equal to that of the smaller module. Thus, when the smaller module is inserted into the bay the door remains in place to cover the portion of the insertion opening unoccupied by the inserted smaller second module. If the larger first module is inserted into the bay instead of the smaller second module, the first module pivots the spring-loaded door member inwardly into the interior of the base housing. Upon subsequent removal of the first module, the door member is spring-driven back to its original position in which it blocks only a portion of the bay's insertion opening. The door thus permits the bay to accommodate either module and automatically blocks off the unoccupied portion of the insertion opening when the smaller module is being utilized.

13 Claims, 2 Drawing Sheets

COMPUTER HAVING MODULE BAY WITH VARIABLE INSERTION OPENING SIZE

BACKGROUND OF THE INVENTION

1. Field of the Invention

The present invention relates generally to electronic apparatus such as computers and, in a preferred embodiment thereof, more particularly relates to computer bay structures used to removably receive various module devices such as, for example, batteries, floppy disk drives, CD ROM drives, hard disk drives and the like.

2. Description of Related Art

The base housing portion of a modern notebook computer is commonly provided with an internal bay area configured to operatively and interchangeably receive one of several modular devices such as, for example, a floppy disk drive, a hard disk drive, a CD ROM drive or a battery. These modules are typically of varying sizes, and the bay area must be physically sized, from a cross-sectional standpoint, to accept the largest one of the several designed-for modules useable with the computer. The selected modular device is operatively inserted rearwardly into the internal computer bay area through an insertion opening formed in an outer wall section of the base housing, with a front portion of the inserted module being disposed within at least a portion of the insertion opening.

Due to the sizing of the insertion opening to accommodate the largest modular device which the bay can operatively accept, an aesthetic problem arises—namely, how to cover the unblocked "gap" left in the exterior housing insertion opening when one of the smaller modular devices is removably placed into the bay area. Several solutions to this problem have been previously utilized but have not proven to be entirely satisfactory.

One such previously proposed solution has been to provide a sliding close-off door member on the front end of the smaller module. When the module is inserted into the bay the door is slid outwardly from the module to cover the insertion opening gap. This undesirably requires the user to perform a two-step process when inserting the module—namely, placing the module into the bay area and then adjusting the module's door member to close off the resulting insertion opening gap.

A second previously proposed solution has been to provide the bay insertion opening itself with a sliding or flip-up door structure that is manually moved across the insertion opening gap after the smaller module is inserted into the internal computer bay area. This also undesirably requires the user to perform a two-step process when inserting the module—placing the module into the bay area and then moving the housing door across the insertion area gap.

A third previously proposed solution has been to attach a front close-off bezel structure to the front end of the smaller module, the bezel structure having a portion which projects outwardly beyond the front end of the module and is positioned to close off the insertion opening gap when the smaller module is operatively inserted into the bay area. This solution is cosmetically unappealing, and further requires that each module bay area in the computer be of the same size so as to accommodate this bezel structure. Additionally, the attached bezel structure undesirably increases the storage and transport size of the overall module.

It is to these problems associated with closing off the unoccupied gap area in a module bay insertion opening that the present invention is directed.

SUMMARY OF THE INVENTION

In carrying out principles of the present invention, in accordance with a preferred embodiment thereof, a portable computer is provided which has a base housing having an exterior wall section in which a module insertion opening is formed. The opening extends inwardly into a bay area disposed within the base housing and adapted to interchangeably receive first and second modular devices, such as a battery and a drive unit, inserted inwardly through the exterior wall opening into the bay area. The first modular device has a cross-sectional area greater than that of the second modular device.

A closure member, preferably a generally plate-shaped door member, is carried by the base housing for movement relative thereto between (1) a first position in which the closure member extends across and blocks only a first portion of the opening and leaves unblocked a second portion thereof through which the second modular device may be inserted into the bay area, and (2) a second position in which, in response to insertion of the first modular device through the opening into the bay area, the closure member is deflected away from the first portion of the opening to permit the entire opening to be occupied by the first modular device.

A biasing structure is provided which is operative to resiliently bias the closure member toward its first position. Preferably, the closure member is carried by the base housing for pivotal movement relative thereto between the first and second positions of the closure member, with the closure member in its second position being deflected into the interior of the base housing, and the biasing structure is a spring member carried by the base housing and operatively engaging the closure member.

Thus, by using the specially positioned and configured closure member, the insertion opening can accommodate either of the differently sized modular devices while automatically preventing the presence of a visible gap in the insertion opening when either module is operatively received in the computer bay area.

DETAILED DESCRIPTION

Figure 1:
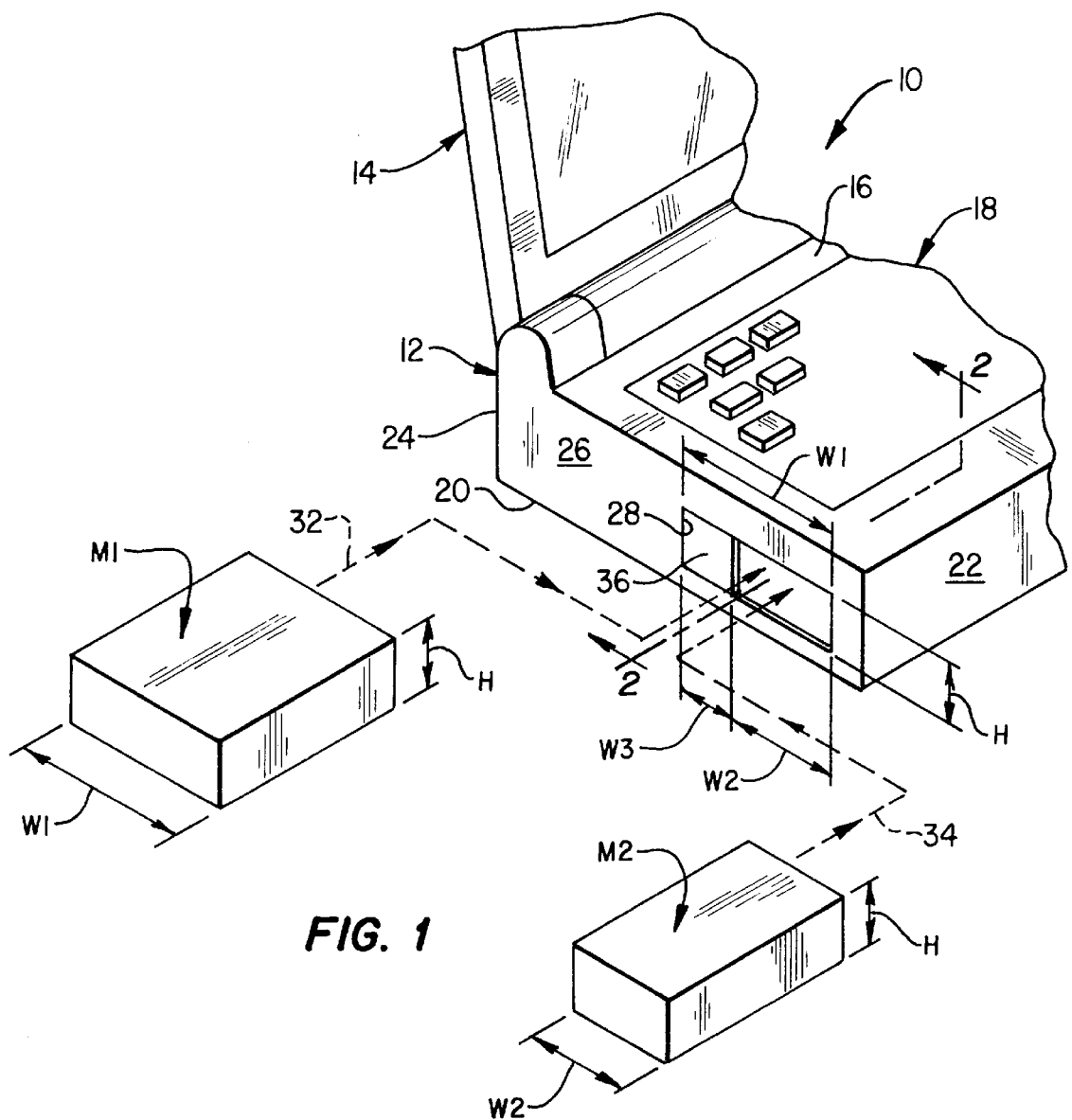
FIG. 1 is a simplified perspective view of a portion of a representative notebook computer having disposed therein a specially designed bay structure embodying principles of the present invention and sized to removably receive a selectively variable one of a plurality of differently sized modular devices, such as the illustrated modules M1 and M2.

Perspectively illustrated in simplified form in FIG. 1 is a portion of an electronic apparatus, representatively a portable notebook computer 10, which embodies principles of the present invention. Notebook computer 10 includes a rectangular base housing 12, and a somewhat thinner rectangular display housing 14. Base housing 12 has a top side 16 upon which a conventional keyboard assembly 18 is mounted, a bottom exterior side wall 20, opposite front and rear exterior side walls 22 and 24, and a left exterior end wall 26.

The display housing 14 has a display screen 28 mounted on its front or inner side 30, and is connected by a suitable hinge structure 32 to a top rear corner edge portion of the base housing 12 for pivotal movement relative to the base housing between a generally upright opened use orientation (shown in FIG. 1), and a closed storage and transport orientation in which the display housing 14 extends across and covers the top side 16 of the base housing 12. Suitable latch means (not shown) are provided for releasably holding the display housing 14 in this closed storage and transport orientation.

Figure 2:
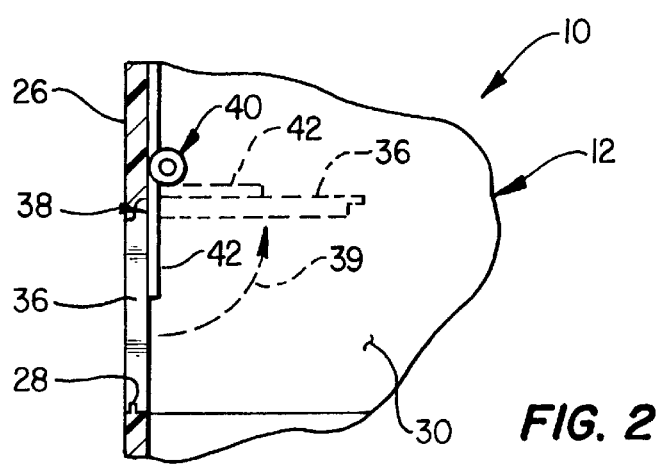
FIG. 2 is an enlarged scale simplified cross-sectional view through a portion of the bay structure and illustrates the operation of a specially designed pivotal closure door incorporated therein at the module insertion portion of the bay structure.

Referring now to FIGS. 1 and 2, a horizontally elongated rectangular insertion opening 28 is formed in a front portion of the base housing end wall 26 and has a horizontal length 1 and a vertical height H. The insertion opening 28 forms the exterior opening into an internal bay area 30 (see FIG. 2) disposed within the base housing 12 directly behind the insertion opening 28. Bay 30 is representatively sized to operatively accept two differently sized modular devices M1 and M2 which are schematically shown in FIG. 1. Each module M1 and M2 has a rectangular body, with the body of module M1 having a horizontal width W1 and a vertical height H, and the body of module M2 having a vertical height H and a horizontal width W2 smaller than the other module's width W1.

Modules M1 and M2 are interchangeably insertable rearwardly through the housing opening 28 into the bay area 30, as respectively indicated by the dashed arrows 32,34 in FIG. 1. In a conventional manner, each module is provided on its rear end with an electrical connector (not shown) which is releasably mateable with a corresponding electrical connector (also not shown) at the back end of the bay area to operatively couple the inserted module with the electronics of the computer 10. Although the modules M1 and M2 could be a variety of different types of devices, module M1 is illustratively a hard disk drive, and the cross-sectionally smaller module M2 is a storage battery.

Figure 3:
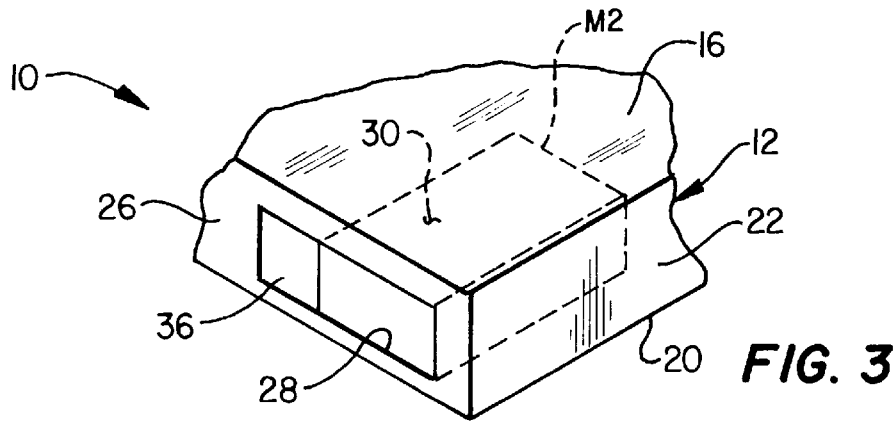
FIG. 3 is a simplified perspective view of a portion of the computer with the module M1 operatively inserted into its bay structure.

According to a key aspect of the present invention, a generally plate-shaped closure door member 36 having a horizontal width W3 is pivotally secured, as at point 38 adjacent the top side edge of the insertion opening 28, to the base housing end wall 26 for pivotal movement relative thereto between (1) a closure position (shown in solid line form in FIGS. 1–3) in which the door member 36 extends vertically across and blocks off a left end portion of the insertion opening 28, leaving therein an open gap having a horizontal width W2, and (2) an inwardly deflected position (shown in phantom in FIGS. 2 and 4, and in phantom in FIG. 5) in which the door member 36 is swung upwardly into the interior of the base housing 12 away from the insertion opening 28 as indicated by the dashed arrow 39 in FIG. 2. A coil spring member 40 is mounted within the base housing 12 and has a leg portion 42 which engages the back side of the closure door 36 and resiliently biases the closure door toward its vertical closure position.

When the cross-sectionally smaller module M2 is inserted into the bay area 30 through the right portion of the insertion opening 28 unblocked by the closure door 36 (see FIG. 3), the door 36 remains in its vertical closure orientation, thus automatically blocking off the gap which would otherwise exist in the left end portion of the insertion opening 28 in the absence of the door 36. In contrast to conventional door or bezel apparatus used to aesthetically close off such gap, the user of the computer does not have to manually manipulate the door after the smaller module is inserted, the door does not have to be mounted on the module, and a close-off bezel does not have to be secured to the module to close off the resulting insertion opening gap.

Figure 4:
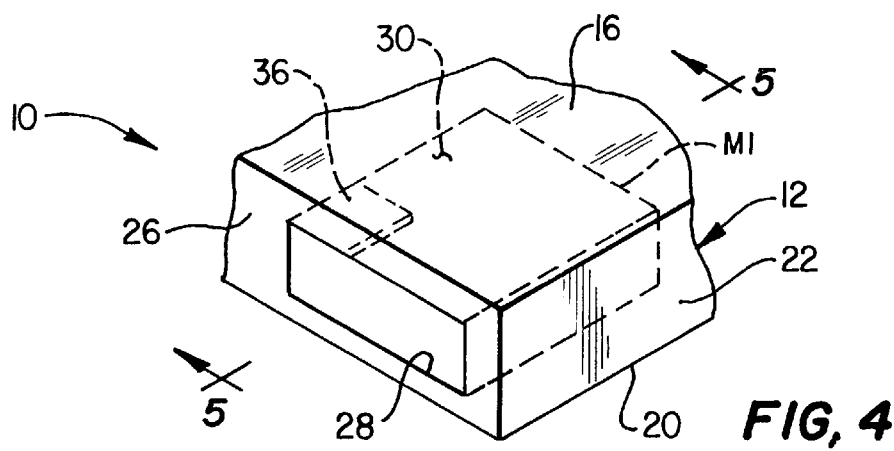
FIG. 4 is a view similar to that in FIG. 3 but with the module M2 operatively inserted into the bay structure.
Figure 5:
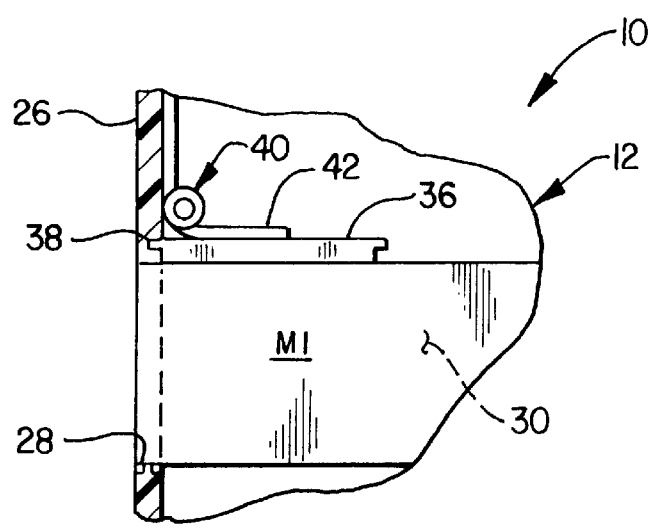
FIG. 5 is an enlarged scale cross-sectional view through the bay structure taken generally along line 5—5 of FIG. 4.

As shown in FIGS. 4 and 5, when the cross-sectionally larger module M1 is inserted into the bay area 30 in place of the module M2, the module M1 occupies essentially the entire cross-sectional area of the insertion opening 28 and thus automatically pivots the closure door 36 inwardly and upwardly to its generally horizontal orientation within the base housing interior depicted in FIGS. 4 and 5. Thus, by using the specially positioned and configured door member 36, the insertion opening 28 can accommodate either of the modules M1,M2 while automatically preventing the presence of a visible gap in the insertion opening 28 when either module is operatively received in the computer bay area 30.

While the door member 36 has been illustrated as being supported adjacent a top side edge portion of the insertion opening 28, it will be readily appreciated that it could alternatively be supported in a manner such that, for example, it pivots inwardly from an end edge of the opening 28 or a bottom side edge portion thereof if desired. Additionally, other types of return spring structures could be utilized to resiliently bias the closure door 36 toward its illustrated closure position.

The foregoing detailed description is to be clearly understood as being given by way of illustration and example only, the spirit and scope of the present invention being limited solely by the appended claims.

What is claimed is:

1. Electronic apparatus comprising:
    a housing having an internal area and a wall opening inwardly through which a device may be operatively inserted into said internal area; electronic circuitry operatively disposed within said housing and being electronically mateable with the inserted device; and
    a single closure member carried by said housing at said wall opening and being:
        (1) resiliently biased toward a first position in which said closure member blocks only a portion of said wall opening and leaves an unblocked portion of said wall opening constituting a major portion and essentially the entire remainder thereof; and
        (2) inwardly deflectable to a second position by a device operatively inserted through said wall opening and having a cross-sectional area greater than the unblocked area of said wall opening,
    said closure member being pivotable relative to said housing between said first and second positions.

2. The electronic apparatus of claim 1 wherein said electronic apparatus is a computer.

3. The electronic apparatus of claim 2 wherein said computer is a portable computer.

4. The electronic apparatus of claim 3 wherein said portable computer is a notebook computer.

5. The electronic apparatus of claim 1 wherein said closure member is a generally plate-shaped door member.

6. The electronic apparatus of claim 1 wherein said closure member is resiliently biased toward said first position by a spring structure operatively engaging said closure member.

7. The electronic apparatus of claim 1 wherein:

said wall opening has an elongated configuration, and said closure member in said first position blocks an end portion of said wall opening.

8. A portable computer comprising:

a base housing having an exterior wall section in which a module insertion opening is formed, and an internal bay area adapted to interchangeably receive first and second modular devices inserted inwardly through said module insertion opening, the first modular device having a cross-sectional area greater than that of the second modular device;

electronic circuitry operatively disposed within said bay area and being electronically mateable with the inserted first and second modular devices; and a single closure member carried by said base housing at said module insertion opening for movement relative to said base housing between:

a first position in which said closure member extends across and blocks only a first portion of said module insertion opening and leaves unblocked a second major portion thereof, which constitutes essentially the entire remainder of said module insertion opening, through which the second modular device may be inserted into said bay area, and a second position in which, in response to insertion of the first modular device through said module insertion opening into said bay area, said closure member is deflected away from said first portion of said module insertion opening; and a biasing structure operative to resiliently bias said closure member toward said first position thereof, said closure member being pivotable relative to said base housing between said first and second positions.

9. The portable computer of claim 8 wherein said portable computer is a notebook computer.

10. The portable computer of claim 8 wherein said closure member is a generally plate-shaped door member.

11. The portable computer of claim 8 wherein said biasing structure includes a spring member carried by said base housing and operatively engaging said closure member.

12. The portable computer of claim 8 wherein:

said exterior wall section is a vertically oriented exterior wall section, and said closure member in said first position blocks an end portion of said module insertion opening.

13. The portable computer of claim 8 wherein:

said exterior wall section is a vertically oriented exterior wall section, said module insertion opening has a top side edge portion, and said closure member is carried by a portion of said base housing adjacent said top side edge portion of said module insertion opening for pivotal movement relative to said base housing between said first and second positions.

\* \* \* \* \*